Patented Sept. 1, 1936

2,052,889

UNITED STATES PATENT OFFICE

2,052,889

ADDITION COMPOUNDS OF METHYL ETHER AND A PROCESS FOR THEIR PREPARATION

Donald J. Loder and Kenneth E. Walker, Wilmington, Del., assignors to E. I. du Pont de Nemours & Company, Wilmington, Del., a corporation of Delaware No Drawing. Application November 25, 1931, Serial No. 577,386

3 Claims. (Cl. 260—11)

This invention relates to a composition of matter and a process for its preparation and more particularly to a process for the preparation of an addition compound of methyl ether with a metal.

An object of the present invention is to provide a process for the preparation of compounds which may be designated as methyl ether-complexes of metals. A further object of the invention is to provide a process in which these complexes are prepared from methyl ether and an anhydrous halide of the metal. A still further object of the invention is to provide a process wherein the vapors of methyl ether are passed over a metal halide at atmospheric or elevated pressure whereby addition compounds may be prepared. Other objects and advantages of the invention will hereinafter appear.

We have found that various compounds can be prepared from methyl ether and metal halides by passing vapors of the ether over the anhydrous halide of the metal whereby compounds having unusual chemical and physical characteristics are obtained. For example, by passing methyl ether over anhydrous aluminum chloride we have discovered that one molecular proportion of methyl ether will combine with one molecular proportion of the anhydrous aluminum chloride to form a mobile liquid which can be heated to 150° C. without any apparent change but which decomposes above this temperature. More methyl ether can be added to the aluminum chloride-methyl ether complex, already formed, until approximately two molecular proportions of the ether have been adsorbed, thereby giving a solid substantially stable, aluminum chloride-methyl ether-complex. All metals will not apparently give stable forms of both the liquid and solid complex. We have found that the following complexes can be prepared by our process: calcium chloride forms a solid complex with methyl ether at high pressures and temperatures, e. g. 100–500 atmospheres and 150–250° C.; titanium tetrachloride gives a yellowish solid complex having the composition $TiCl_4CH_3OCH_3$; tin tetrachloride gives a solid, quite volatile, white, crystalline complex with methyl ether; antimony trichloride forms a stable liquid complex which has the composition $SbCl_3 2CH_3OCH_3$, this liquid readily conducts the electric current; bismuth trichloride forms a white solid complex; ferric chloride forms a stable liquid complex. The formulæ, where given, are merely indicative of the probable formulæ, the salt combining with the ether in approximately the proportion designated.

The liquid and solid complex can be prepared by first placing the anhydrous halide of the metal, a chloride, bromide, or fluoride may be used, in a suitable receptacle, such as a water-jacketed autoclave, into which the methyl ether vapors are injected. During the reaction it is advisable to keep the reactants well agitated and the temperature within proper limits, i. e. below the decomposition temperature of the final product and yet high enough to insure a good reaction rate. During the initial stages of the reaction we find that usually the ether combines but slowly with the metal halide. This disadvantage, however, can be readily overcome by initiating the reaction with a methyl ether-metal-complex. This is accomplished, for example, in the following manner. A small amount of the methyl ether-metal-complex, which it is desired to prepare, is placed in the autoclave and the anhydrous chloride of the metal and methyl ether are simultaneously added thereto with thorough stirring. In this manner we have found that the complexes may be prepared rapidly and in large quantities.

As indicated above, the metals which we have found capable of forming a complex with methyl ether include: aluminum, titanium, tin, antimony, bismuth, iron, or in fact any metal having an atomic weight of from 27–209.

Under some circumstances it may be found advisable to use high pressures and temperatures to effect the formation of the compounds, such, for instance, as in the case of the preparation of the calcium chloride-methyl ether-complex, but usually the complex will form easily at ordinary room temperatures and pressures. As the reactions are usually exothermic it is generally advisable to cool the reacting mass during the reaction to maintain the desired temperature conditions.

Our ether-metal-complexes have been found to be useful for many purposes, such, for example, as an electro-plating bath from which the metal may be deposited, which has been described in the copending application of Hugh R. Jenkinson, Ser. No. 577,701, and as a condensing agent for the acceleration of many chemical reactions.

From a consideration of the above specification, it will be realized that any process for the preparation of a methyl ether-complex of a metal wherein the methyl ether and anhydrous halide are simultaneously added to an already formed methyl ether-metal-halide-complex, will come within the scope of this invention as well as the methyl ether-complexes of metals hereinbefore described without departing from the scope of this invention or sacrificing any of the advantages that may be derived therefrom.

We claim:

1. A process for the preparation of an aluminum halide-dimethyl ether addition compound which comprises simultaneously contacting dimethyl ether and an anhydrous aluminum halide with a dimethyl ether-aluminum halide addition compound at a temperature between 100–250° C.

2. An aluminum chloride-dimethyl ether addition compound.

3. A liquid aluminum chloride-dimethyl ether addition compound.

DONALD J. LODER.
KENNETH E. WALKER.